United States Patent
Malhotra et al.

(10) Patent No.: US 12,413,502 B2
(45) Date of Patent: *Sep. 9, 2025

(54) SYSTEMS AND METHODS FOR SUBSCRIPTION BASED SELECTIVE EVPN ROUTE DISTRIBUTION

(71) Applicant: Cisco Technology, Inc., San Jose, CA (US)

(72) Inventors: Neeraj Malhotra, Los Gatos, CA (US); Balaji Pitta Venkatachalapathy, San Ramon, CA (US); Krishnaswamy Muddenahally Ananthamurthy, San Ramon, CA (US); Ali Sajassi, San Ramon, CA (US); Dhananjaya Kasargod Rao, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/776,894

(22) Filed: Jul. 18, 2024

(65) Prior Publication Data
US 2024/0372747 A1 Nov. 7, 2024

Related U.S. Application Data

(63) Continuation of application No. 18/641,898, filed on Apr. 22, 2024, which is a continuation of application
(Continued)

(51) Int. Cl.
*H04L 12/46* (2006.01)
*H04L 45/00* (2022.01)
(Continued)

(52) U.S. Cl.
CPC .......... *H04L 12/4641* (2013.01); *H04L 45/02* (2013.01); *H04L 45/50* (2013.01);
(Continued)

(58) Field of Classification Search
None
See application file for complete search history.

(56) References Cited

U.S. PATENT DOCUMENTS 7,359,393 B1 * 4/2008 Nalawade ............... H04L 45/04 370/254
7,602,796 B2 * 10/2009 Scudder .................. H04L 45/04 370/392
(Continued)

OTHER PUBLICATIONS

Etutorials: "Outbound Route Filtering (ORF) and Route Refresh Features," Networking (/Networking/) / MPLS and VPN Architectures(/Networking/MPLS+VPN+Architectures/), Date of Downloading Nov. 17, 2020, pp. 1-8.

*Primary Examiner* — Anh Vu H Ly
(74) *Attorney, Agent, or Firm* — Baker Botts L.L.P.

(57) ABSTRACT

In one embodiment, a method includes receiving, by a route reflector, a subscription request from a first provider edge node in a network and generating a subscription policy for the first provider edge node. The method also includes receiving a first Ethernet Virtual Private Network (EVPN) Type 2 Route from a second provider edge node, assigning a sequence number to the first EVPN Type 2 Route, and communicating the first EVPN Type 2 Route with the sequence number to the first provider edge node. The method further includes receiving a second EVPN Type 2 Route from a third provider edge node, generating an updated sequence number in response to receiving the second EVPN Type 2 Route from the third provider edge node, and communicating the second EVPN Type 2 Route with the updated sequence number to the first provider edge node and the second provider node.

24 Claims, 3 Drawing Sheets

Related U.S. Application Data

No. 17/813,959, filed on Jul. 21, 2022, now Pat. No. 11,979,256, which is a continuation of application No. 17/164,690, filed on Feb. 1, 2021, now Pat. No. 11,398,927.

(51) Int. Cl.
 *H04L 45/02* (2022.01)
 *H04L 45/50* (2022.01)
 *H04L 45/741* (2022.01)
 *H04L 101/622* (2022.01)

(52) U.S. Cl.
 CPC ............ *H04L 45/66* (2013.01); *H04L 45/741* (2013.01); *H04L 2101/622* (2022.05)

(56) References Cited

U.S. PATENT DOCUMENTS

| | | |
|---|---|---|
| 8,861,345 B2 | 10/2014 | Hares et al. |
| 9,106,530 B1 | 8/2015 | Wang |
| 9,860,169 B1 | 1/2018 | Ninan et al. |
| 10,142,129 B1 | 11/2018 | Gupta et al. |
| 10,594,592 B1 * | 3/2020 | Wang ..................... H04L 45/04 |
| 10,841,216 B1 | 11/2020 | Hoang et al. |
| 11,283,711 B2 | 3/2022 | T |
| 11,398,927 B1 | 7/2022 | Malhotra et al. |
| 11,979,256 B2 * | 5/2024 | Malhotra .............. H04L 45/741 |
| 2006/0245374 A1 | 11/2006 | Patel et al. |
| 2013/0117449 A1 | 5/2013 | Hares et al. |
| 2015/0103841 A1 | 4/2015 | Yang et al. |
| 2016/0378606 A1 | 12/2016 | Sajassi et al. |
| 2017/0026233 A1 | 1/2017 | Boutros et al. |
| 2017/0093641 A1 * | 3/2017 | Utgikar ................... H04L 45/02 |
| 2017/0093834 A1 | 3/2017 | Natu et al. |
| 2018/0287929 A1 * | 10/2018 | Means ................ H04L 12/4633 |
| 2019/0109730 A1 | 4/2019 | Uttaro et al. |
| 2019/0229937 A1 | 7/2019 | Nagarajan et al. |
| 2020/0084180 A1 | 3/2020 | Zeng et al. |
| 2020/0136955 A1 | 4/2020 | Chen et al. |
| 2021/0021509 A1 | 1/2021 | Sajassi et al. |
| 2021/0067463 A1 * | 3/2021 | Mukhopadhyay .... H04L 45/033 |
| 2021/0119829 A1 | 4/2021 | Ranpise et al. |
| 2021/0119830 A1 | 4/2021 | Ranpise et al. |
| 2021/0273827 A1 * | 9/2021 | Vairavakkalai ....... H04L 47/193 |
| 2022/0103425 A1 | 3/2022 | Lo et al. |
| 2022/0124033 A1 | 4/2022 | He et al. |

* cited by examiner

SYSTEMS AND METHODS FOR SUBSCRIPTION BASED SELECTIVE EVPN ROUTE DISTRIBUTION

PRIORITY

This nonprovisional application is a continuation under 35 U.S.C. § 120 of U.S. patent application Ser. No. 18/641,898 filed on Apr. 22, 2024, which is a continuation under 35 U.S.C. § 120 of U.S. patent application Ser. No. 17/813,959 filed on Jul. 21, 2022, now U.S. Pat. No. 11,979,256, which claims priority to U.S. Utility patent application Ser. No. 17/164,690 filed on Feb. 1, 2021, now U.S. Pat. No. 11,398,927, and entitled "SYSTEMS AND METHODS FOR SUBSCRIPTION BASED SELECTIVE EVPN ROUTE DISTRIBUTION" all of which are hereby incorporated by reference in their entireties.

TECHNICAL FIELD

The present disclosure relates generally to communication networks, and more specifically to systems and methods for subscription based selective EVPN route distribution.

BACKGROUND

Traditionally, a route reflector in an Ethernet Virtual Private Network (EVPN) distributes route updates to all fabric provider edge nodes in an EVPN instance (EVI) in random order. A single EVPN host route update from a local provider edge node results in a Border Gateway Protocol (BGP) message from the route reflector for each of the remote provider edge nodes. However, only a handful of provider edge nodes may have active flows to a given host and therefore need the updated host route for data path convergence.

DESCRIPTION OF EXAMPLE EMBODIMENTS

Overview

Figure 1:
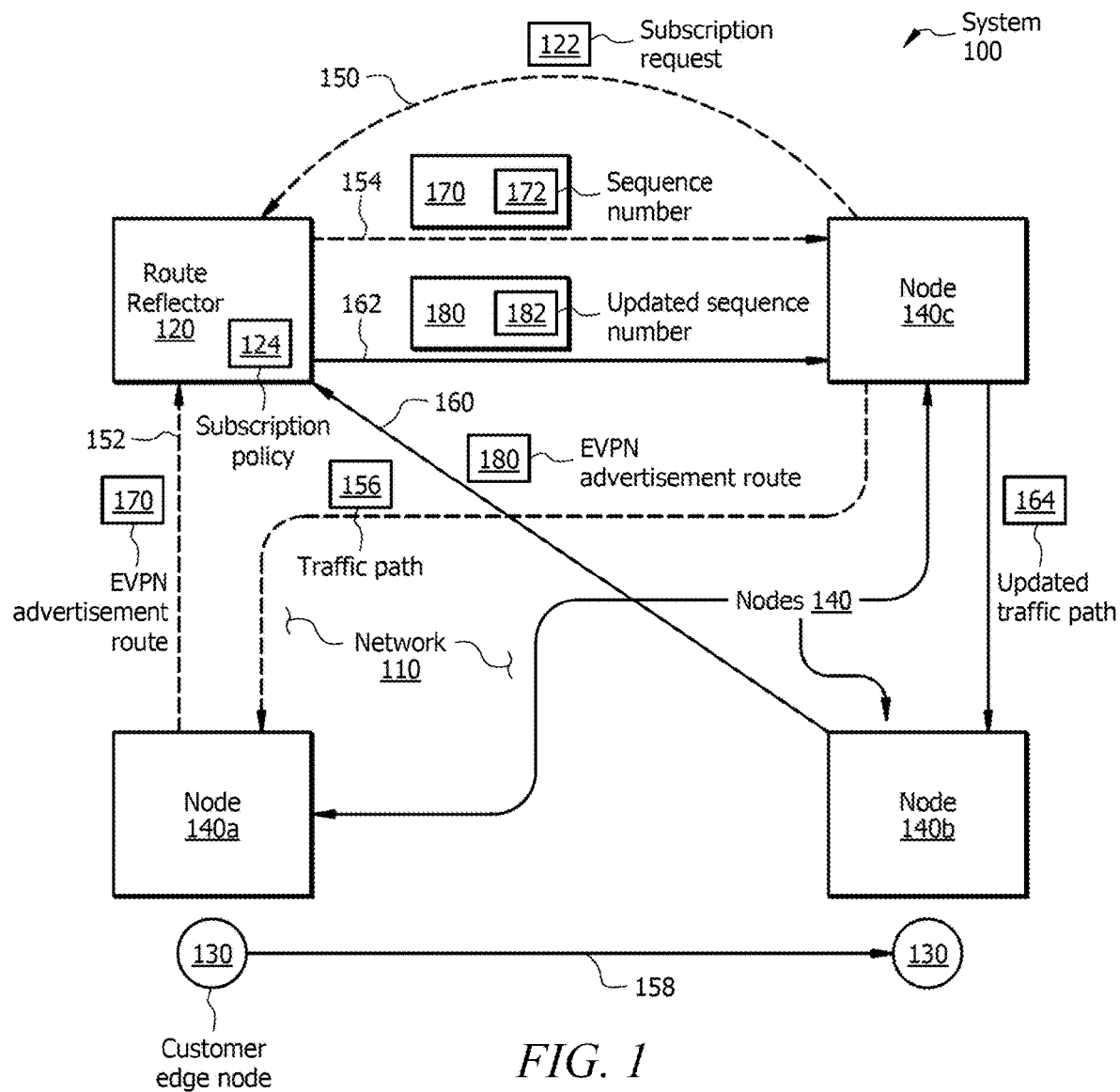
FIG. 1 illustrates an example system for subscription based selective EVPN route distribution.

According to an embodiment, a route reflector includes one or more processors and one or more computer-readable non-transitory storage media coupled to the one or more processors and including instructions that, when executed by the one or more processors, cause the route reflector to perform operations. The operations include receiving a subscription request from a first provider edge node in a network, generating a subscription policy for the first provider edge node, and receiving a first EVPN Type 2 Route from a second provider edge node in the network. The first EVPN Type 2 Route includes at least one address of a customer edge node. The operations also include assigning a sequence number to the first EVPN Type 2 Route and communicating the first EVPN Type 2 Route with the sequence number to the first provider edge node. The operations further include receiving a second EVPN Type 2 Route from a third provider edge node. The second EVPN Type 2 Route includes the at least one address of the customer edge node. The operations further include generating an updated sequence number in response to receiving the second EVPN Type 2 Route from the third provider edge node and communicating the second EVPN Type 2 Route with the updated sequence number to the first provider edge node and the second provider node.

In certain embodiments, the customer edge node is locally attached to the second provider edge node when the route reflector receives the first EVPN Type 2 Route from the second provider node and the customer edge node is locally attached to the third provider edge node when the route reflector receives the second EVPN Type 2 Route from the third provider node.

In some embodiments, the subscription request includes an outbound route filter (ORF). The ORF may include an Address Family Identifier (AFI)/Subsequent Address Family Identifier (SAFI) component that is set to EVPN. The ORF may define a Route Type 2 ORF type as a sub-type-length-value (sub-TLV). The sub-TLV indicates one of the following Route Type 2 subscription types: Media Access Control (MAC) only; Internet Protocol version 4 (IPv4) only; Internet Protocol version 6 (IPv6) only; MAC+IPv4; or MAC+IPv6.

In certain embodiments, the route reflector generates the subscription policy in accordance with one of the following subscription implementation options: an exact match subscription database (DB) per update group (UG); a subscription bitmask per Route Type 2; or a Transmit List (TXLIST) per UG. In some embodiments, the first provider edge node is a border provider edge node and the customer edge node is a host. In certain embodiments, the at least one address of the customer edge node includes at least one of a MAC address and an Internet Protocol (IP) address The network may be an EVPN Integrated Routing and Bridging (IRB) network.

According to another embodiment, a method includes receiving, by a route reflector, a subscription request from a first provider edge node in a network and generating, by the route reflector, a subscription policy for the first provider edge node. The method also includes receiving, by the route reflector, a first EVPN Type 2 Route from a second provider edge node in the network. The first EVPN Type 2 Route includes at least one address of a customer edge node. The method also includes assigning, by the route reflector, a sequence number to the first EVPN Type 2 Route and communicating, by the route reflector, the first EVPN Type 2 Route with the sequence number to the first provider edge node. The method further includes receiving, by the route reflector, a second EVPN Type 2 Route from a third provider edge node. The second EVPN Type 2 Route comprises the at least one address of the customer edge node. The method also includes generating, by the route reflector, an updated sequence number in response to receiving the second EVPN Type 2 Route from the third provider edge node and communicating, by the route reflector, the second EVPN Type 2 Route with the updated sequence number to the first provider edge node and the second provider node.

According to yet another embodiment, one or more computer-readable non-transitory storage media embody instructions that, when executed by a processor, cause the processor to perform operations. The operations include receiving a subscription request from a first provider edge node in a network, generating a subscription policy for the first provider edge node, and receiving a first EVPN Type 2 Route from a second provider edge node in the network. The first EVPN Type 2 Route includes at least one address of a customer edge node. The operations also include assigning a sequence number to the first EVPN Type 2 Route, communicating the first EVPN Type 2 Route with the sequence number to the first provider edge node, and receiving a second EVPN Type 2 Route from a third provider edge node. The second EVPN Type 2 Route includes the at least one address of the customer edge node. The operations further include generating an updated sequence number in response to receiving the second EVPN Type 2 Route from the third provider edge node and communicating the second EVPN Type 2 Route with the updated sequence number to the first provider edge node and the second provider node.

Technical advantages of certain embodiments of this disclosure may include one or more of the following. The systems and methods for subscription based selective EVPN route distribution described herein eliminate 0(N) BGP messaging (one for each of the N remote provider edge nodes) for a single host route update. Messaging delay to ingress provider edge nodes with affected active flows that results from 0(N) messaging at a route reflector is minimized, resulting in faster data plane convergence. Since a Route Type 2 subscription model is utilized by this disclosure (rather an on-demand pull model), unnecessary route update processing at provider edge nodes that do not have active flows is eliminated. IP and/or MAC host route scale across all provider edge nodes is minimized. 0(N) BGP messaging for each Route Type 2 update is eliminated at the route reflector to minimize update delay to provider edges with active flows using this Route Type 2 subscription model. BGP message processing is minimized across all provider edge nodes in the overlay. The systems and methods for subscription based selective EVPN route distribution described herein are fully backwards compatible with provider edges that do not participate in the subscription based Route Type 2 distribution. 0(1) BGP messages are used by certain systems and methods described herein rather than 0 (N) BGP messages sent without route subscription policy. The 0(N) evaluation trade-off to evaluate the subscription policy is insignificant as compared to the 0(N) messaging that is eliminated.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for subscription based selective EVPN route distribution. An EVPN route reflector traditionally distributes EVPN Route Type 2 updates to all fabric provider edge nodes in an EVI in random order. A single EVPN host route update from a local provider edge results in 0(N) BGP messages from the route reflector, one for each of the N remote provider edge nodes. In reality, only a handful of provider edge nodes may have active flows to a given host, and as such need the updated host route for data path convergence. Depending on the fabric provider edge scale and random update ordering on the route reflector, an 0(N) messaging at the route reflector may result in unwanted messaging delay to ingress provider edge nodes that actually have active flows to the host, resulting in significantly higher convergence time.

The subscription based conversational control plane procedure described herein allows an EVPN route reflector to reflect an EVPN host route to only the remote nodes that have active bridged or routed flows to the host and therefore subscribe to the route. Certain systems and methods described herein assign a centralized sequence number at the route reflector to provide for EVPN mobility. EVPN mobility procedures, when used with subscription based selective host route distribution, allow fast roaming capability in an EVPN network by minimizing BGP Route Type 2 update generation time from the route reflector to the ingress node following a host move.

FIG. 1 illustrates an example system 100 for subscription based selective EVPN route distribution. System 100 or portions thereof may be associated with an entity, which may include any entity, such as a business or company that utilizes subscription based selective EVPN route distribution. The components of system 100 may include any suitable combination of hardware, firmware, and software. For example, the components of system 100 may use one or more elements of the computer system of FIG. 3. System 100 of FIG. 1 includes a network 110, a route reflector 120, a customer edge device 130, and network nodes 140.

Network 110 of system 100 is any type of network that facilitates communication between components of system 100. In the illustrated embodiment of FIG. 1, network 110 is an IRB EVPN. Network 110 may connect one or more components of system 100. One or more portions of network 110 may include an ad-hoc network, an intranet, an extranet, a VPN, an EVPN (e.g., an IRB EVPN), a local area network (LAN), a wireless LAN (WLAN), a virtual LAN (VLAN), a wide area network (WAN), a wireless WAN (WWAN), an SD-WAN, a metropolitan area network (MAN), a portion of the Internet, a portion of the Public Switched Telephone Network (PSTN), a cellular telephone network, a Digital Subscriber Line (DSL), a 3G network, a 4G network, a 5G network, a Long Term Evolution (LTE) network, a combination of two or more of these, or other suitable types of networks. Network 110 may include one or more different types of networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like.

Route reflector 120 of system 100 represents any suitable network component (e.g., a physical or virtual router) that can advertise routes to nodes 140 of network 110. In certain embodiments, route reflector 120 is a BGP route reflector. Route reflector 120 may receive routing updates from one or more nodes 140 of network 110. In some embodiments, route reflector 120 reflects EVPN prefixes to nodes 140 (e.g., provider edge nodes) such that nodes 140. In certain embodiments, route reflector 120 may be an edge router (e.g., a subscriber edge router, a label edge router, etc.), a BGP router, a wired router, a wireless router, a virtual router, a core router, a gateway, a combination thereof, or any other suitable type of router. In certain embodiments, route reflector 120 may receive, create, process, store, and/or send traffic to other components within network 110. Route reflector 120 may be controlled by one or more entities (e.g., a network service provider). Route reflector 120 may be located in one or more data centers, remote branches, or any other suitable location.

Customer edge device 130 of system 100 is a device that is identified by a MAC and/or IP address. In certain embodiments, customer edge device 130 may be a host, a router, a switch, and the like. Customer edge device 130 may send and/or receive data within network 110. In some embodiments, customer edge device 130 connects to one or more nodes 140 of network 110. For example, as illustrated in FIG. 1, customer edge device 130 may connect to node 140a and/or node 140b of network 110.

Nodes 140 of network 110 are connection points within network 110 that receive, create, store and/or send data along a path. Nodes 140 may include one or more redistribution points that recognize, process, and forward data to other nodes 140 of network 110. Nodes 140 may include virtual and/or physical edge nodes. In certain embodiments, one or more nodes 140 include data communications equipment such as routers, servers, printers, workstations, switches, bridges, modems, hubs, and the like. Nodes 140 may include provider edge nodes, customer edge nodes, border nodes, etc.

In the illustrated embodiment of FIG. 1, nodes 140 include node 140a, node 140b, and node 140c. In certain embodiments, route reflector 120, node 140a, node 140b, and node 140c are configured to send and/or receive EVPN advertisement routes. For example, as illustrated in FIG. 1, node 140a communicates EVPN advertisement route 170 to route reflector 120, and node 140b communicates EVPN advertisement route 180 to route reflector 120. As another example, as illustrated in FIG. 1, route reflector 120 communicates EVPN advertisement route 170 to node 140c, and route reflector 120 communicates EVPN advertisement route 180 to node 140a and node 140c. EVPN advertisement routes 170 and 180 may include BGP EVPN advertisement routes such as Type 2 routes, Type 3 routes, Type 5 routes, and the like. EVPN Type 2 routes are MAC/IP routes that may be used by nodes 140 of network 110 to advertise MAC and/or IP addresses, address reachability, Address Resolution Protocol (ARP) entry, IP/MAC binding, and/or host IP routing information to other nodes 140. In some embodiments, nodes 140 include one or more border nodes. For example, node 140c of FIG. 1 may be a border node that is configured as a default route across all provider edge nodes and therefore may be configured to receive all EVPN advertisement route updates (e.g., EVPN Type 2 route updates).

Flow Based Route Subscription Requirements. Across EVPN symmetric and asymmetric IRB use cases, depending on active flows via nodes 140, nodes 140 may require one or more of the following: (1) a remote MAC route to be installed in MAC-virtual routing and forwarding (VRF) to forward bridged flows; (2) a remote IP host route to be installed in IP-VRF to forward host routed flows in a Symmetric IRB scenario; (3) a remote IP→MAC binding to be installed as an adjacency or next-hop forwarding object in an Asymmetric IRB scenario; and/or (4) a remote IP→MAC binding to be installed in ARP suppression cache.

As such, the route subscription requirements may include one or more of the following: (1) Subscription based route distribution is only required for EVPN MAC+IP and MAC only Type 2 routes. Distribution of all other EVPN route types is not affected. (2) Each node 140 that participates in subscription based route distribution does not receive any Route Type 2 update as a default policy, unless that particular node 140 overrides the default policy with a Route Type 2 subscription. (3) The Route Type 2 subscription mechanism between nodes 140 and route reflector 120 must support route subscription from nodes 140 to route reflector 120. The subscription mechanism may be identified by: (a) "a host IP and an import Route Target (RT) set" that allows MAC+IP Route Type 2 updates from route reflector 120 to nodes 140 that exactly match the specified IP and at least one of the RT(s) in the RT set; (b) "a host IP, MAC, and an import RT set" that allows MAC+IP Route Type 2 updates from route reflector 120 to nodes 140 that exactly match the specified IP, MAC, and at least one of the RT(s) in the RT set; (c) "a host MAC and an import RT set" that allows MAC+IP and MAC Route Type 2 updates that exactly match the specified MAC, and any of the RT(s) in the RT list; and/or (d) "a wild card" that allows a border node (e.g., node 140c) to subscribe for all Route Type 2 updates by default. An explicit wild card registration/un-registration may allow border role transitions to be handled without a BGP session flap. (4) Subscription is implicit for nodes 140 that originate a local Route Type 2 path. For example, an originator of a Route Type 2 path is implicitly subscribed for the Route Type 2 updates.

EVPN Route Type 2 Subscription Signaling. The BGP ORF framework defined in RFC 5291, which is incorporated herein by reference, is used as a foundation and further extended to signal EVPN Route Type 2 subscriptions from nodes 140 to route reflector 120. A Route Type 2 subscription request is signaled as an outbound route filter policy from nodes 140 to route reflector 120. AFI/SAFI is set to EVPN. A new ORF type is defined for EVPN Route Type 2. In certain embodiments, ORF entry for Route Type 2 ORF type is defined as a sub-TLV, where a sub-type indicates one of the following Route Type 2 subscription types: (1) MAC only; contents are MAC address and RT(s). Length is MAC address length (6 bytes)+RT TLV length; (2) IPv4 only; contents are IPv4 address and RT(s). Length is IPv4 address length (4 bytes)+RT TLV length; (3) IPv6 only; contents are IPv6 address and RT(s). Length is IPv6 address length (16 bytes)+RT TLV length; (4) MAC+IPv4; contents are MAC+IPv4 and RT(s). Length is MAC address length (6 bytes)+IPv4 address length (4 bytes)+RT TLV length; and (5) MAC+IPv6; contents are MAC+IPv6 and RT(s). Length is MAC address length (6 bytes)+IPv6 address length (16 bytes)+RT TLV length. These Route Type 2 subscription types cover IRB use cases across both symmetric and asymmetric IRB architectures.

Subscription Based Route Type 2 Update Generation. In certain embodiments, each node 140 that signals a Route Type 2 subscription policy results in a separate UG at route reflector 120. 'N' nodes 140 in a fabric may result in 'N' UGs. As a result, route reflector 120 may evaluate a Route Type 2 update 'N' times, but if one node 140 has signaled a matching subscription policy, only a single BGP message is formatted and sent. While ORF is used as a signaling mechanism to signal Route Type 2 subscription, this does not necessarily imply using existing ORF implementation for Route Type 2 outbound policy enforcement. To further minimize 0(N) evaluation tradeoff resulting from Route Type 2 subscription based update generation at route reflector 120, more efficient alternatives are considered: (1) Existing ORF implementations; (2) Exact match subscription DB per UG; (3) Subscription bitmask per Route Type 2; and (4) TXLIST per UG. The above implementation options for subscription based Route Type 2 update generation are described as follows:

(1) Existing ORF implementations. Existing ORF implementations typically use a prefix-list for each UG to track prefix-based ORF policies. This prefix-list is internally implemented as a radix trie. For a route update, each of 'N' UGs is evaluated via its ORF prefix-list radix lookup. The radix lookup result determines whether the route is sent to that UG. The prefix-list/radix based ORF implementation is not efficient for host IP routes. The prefix-list/radix based ORF implementation is not suitable for exact-match applications like MAC-IP or MAC Route Type 2.

(2) Exact match subscription DB per UG. 'N' UGs are used for 'N' nodes 140. A Route Type 2 subscription Adelson-Velsky and Landis (AVL) DB is maintained for each UG. For a Route Type 2 update, each of 'N' UGs is evaluated via a lookup in that UG's Route Type 2 subscription DB. The lookup result determines if a Route Type 2 update is sent to the UG/node 140. As such, the evaluation cost per Route Type 2 is 0 (N*log (n)), where N=number of nodes 140, and n=number of destinations for active flows at node 140. Route reflector 120 may evaluate a Route Type 2 update 'N' times, but if only one node 140 has signaled a matching subscription policy, only a single BGP message is formatted and sent. The subscription DB size 'n' is minimal since destinations for active flows are tracked at nodes 140. Most log (n) lookups result in no match and no update generation.

(3) Subscription bitmask per Route Type 2. 'N' UGs are used for 'N' nodes 140. A subscription bitmask is maintained per-route to track UGs subscribed for that route. For a Route Type 2 update, each UG is evaluated via the route's bitmask check for that UG. The bitmask check result determines if a Route Type 2 update is sent to that UG/node 140. As such, the evaluation cost per Route Type 2 is 0(N), where N=number of nodes 140. Route reflector 120 may evaluate a Route Type 2 update 'N' times, but if only one node 140 has signaled a matching subscription policy, only a single BGP message is formatted and sent. In certain embodiments, a subscription DB per-UG/node 140 may still be required to efficiently update affected route subscriptions on events like node 140 session down.

(4) TXLIST per UG. 'N' UGs are used for 'N' nodes 140. A TXLIST is maintained per UG/node 140. A Route Type 2 subscription by node 140 results in Route Type 2 added to the UG TXLIST. ROUTE TYPE 2 maintains, inline, a dynamic list of UG TXLIST link-points. On a Route Type 2 update, each TXLIST in this dynamic list is processed to schedule a Route Type 2 update to that UG/node 140 (typically by moving it to the back of the TXLIST). UGs that have not subscribed to this Route Type 2 are not evaluated. While memory overhead of multiple TXLIST link-points per-route is required, this option has no evaluation tradeoff.

Above options (2), (3), or (4), or another implementation found more suitable, may be selected for subscription based Route Type 2 update generation, depending on performance/complexity tradeoffs at implementation time. Nodes 140 that do not participate in Route Type 2 subscription capability continue to receive all Route Type 2 updates as per RFC 5291, which ensures full backwards compatibility.

In the illustrated embodiment of FIG. 1, node 140c (e.g., a border node) communicates (see notation 150) a subscription request 122 to route reflector 120. In certain embodiments, subscription request 122 is an EVPN Route Type 2 subscription request that is signaled as an outbound route filter policy from node 140c to route reflector 120. AFI/SAFI may be set to EVPN, and a new ORF type may be defined for EVPN Route Type 2. In response to receiving subscription request 122, route reflector 140 generates a subscription policy 124 for node 140c. In certain embodiments, subscription policy 124 is an EVPN Route Type 2 subscription policy. Route reflector 140 may generate a separate UG for each subscription policy 124.

Customer edge device 130 of FIG. 1 (e.g., a host) connects to node 140a of network 110. In response to node 140a detecting a locally attached MAC and/or IP address for customer edge device 130, node 140a communicates (see notation 152) an EVPN advertisement route 170. In certain embodiments, EVPN advertisement route 170 is an EVPN Type 2 Route. Upon receiving EVPN advertisement route 170 from node 140a, route reflector 120 communicates (see notation 154) EVPN advertisement route 170 (e.g., an EVPN Type 2 route) to subscriber node 140c. Subscriber node 140c now has EVPN advertisement route 170 for customer edge device 130 in MAC and/or IP VRF, depending on the nature of the flow. Node 140c communicates network traffic along path 156 in accordance with EVPN advertisement route 170.

Sequence Number Assignment Procedure. In certain embodiments, customer edge device 130 may move between nodes 140. For example, customer edge device 130 may disconnect from node 140a and connect to node 140b. Since Route Type 2 updates are not distributed to all nodes 140, EVPN mobility procedures as defined in RFC 7432, which is incorporated herein by reference, no longer work. To address this issue, a centralized Route Type 2 sequence number assignment procedure may be implemented at route reflector 130 when subscription based host route distribution is deployed. This centralized sequence number assignment allows existing EVPN mobility procedures on nodes 140 to function as defined in RFC 7432.

In the illustrated embodiment of FIG. 1, node 140a discovers customer edge device 130 and learns a local MAC and/or IP address from customer edge device 130. Node 140a assigns the local MAC and/or IP a sequence number 172 as per RFC 7432. If this is the first mobility event for the local MAC and/or IP address of customer edge device 130, EVPN advertisement route 170 communicated from node 140a to route reflector 120 does not carry a sequence number via a MAC mobility extended community attribute. As such, the value of sequence number 172 for the first mobility event for the local MAC and/or IP address of customer edge device 130 is assumed to be 0.

Route reflector 120, on receiving EVPN advertisement route 170, reflects (see notation 154) EVPN advertisement route 170 with sequence number 172 (e.g., 0) to node 140c that has subscribed to this Route Type 2. Customer edge device 130 then moves (see notation 158) from node 140a to node 140b. Node 140b communicates (see notation 160) EVPN advertisement route 180 to route reflector 120. Upon receiving EVPN advertisement route 180 from node 140b, route reflector 120 compares EVPN advertisement route 180 against any pre-existing best path (e.g., EVPN advertisement route 170) with a different Ethernet Segment Identifier (ESI). Based on the comparison, route reflector 120 updates sequence number 172 to generate an updated sequence number 182. For example, route reflector 120 may update sequence number 172 by a value of one (e.g., from a value of 0 to a value of 1). Route reflector 120 communicates (see notation 162) updated EVPN advertisement route 180 with updated sequence number 182 to node 140c since node 140c subscribed to Route Type 2. Node 140c then communicates network traffic along updated path 164 in accordance with updated EVPN advertisement route 180. Originating node 140a for the previous best path is implicitly subscribed and hence also receives EVPN advertisement route 180 with updated sequence number 182, which allows node 140a to trigger cleanup/duplicate detection procedures for its local path. This sequence number method ensures backwards compatibility with any node 140 that is not participating in subscription-based route distribution.

Sequence Number Assignment Across Paths with Different Route Distinguishers. An EVI requires a Route Distinguisher (RD) that is unique per MAC-VRF and one or more globally unique RTs. In a typical topology where each node 140 uses a different RD, route reflector 120 computes the best path only across all Route Type 2 paths received with a common RD. However, centralized sequence number assignment logic on route reflector 120 for this case requires sequence number comparison across paths with Route Type 2 having different RDs, and hence requires best path computation across all RDs. Centralized sequence number computation on route reflector 120 is enhanced to mimic route server "like" function with local MAC VRF import to accomplish sequence number comparison across Route Type 2 paths with different RDs. However, this MAC VRF import within BGP is only for the purpose of sequence number assignment and is not intended to allow any data path through router reflector 120. This MAC VRF import may be limited to BGP and does not result in the route being downloaded to routing information base (RIB)/forwarding information base (FIB) MAC VRF.

In certain embodiments, route reflector 120 is configured with MAC VRFs in a given fabric and corresponding fabric RTs to perform local MAC VRF import in a mode that does not install any MAC VRF routes in RIB. RT may be auto-derived as autonomous system (AS): Virtual Network Instance (VNI), which results in the same RT across all nodes 140 and route reflector 120 in the fabric AS. In the case of external BGP (eBGP), the AS number may be rewritten to local AS in RT. In some embodiments, a unique RD is derived using Router-ID: AS-Num. In a uniformly orchestrated fabric with the same RT across all nodes 140, MAC VRFs, corresponding RD, RT, and import policy may be auto-created on route reflector 120 for the purpose of sequence number assignment.

Although FIG. 1 illustrates a particular arrangement of network 110, route reflector 120, subscription request 122, subscription policy 124, customer edge device 130, nodes 140, EVPN advertisement route 170, sequence number 172, EVPN advertisement route 180, and updated sequence number 182, this disclosure contemplates any suitable arrangement of network 110, route reflector 120, subscription request 122, subscription policy 124, customer edge device 130, nodes 140, EVPN advertisement route 170, sequence number 172, EVPN advertisement route 180, and updated sequence number 182.

Although FIG. 1 illustrates a particular number of networks 110, route reflectors 120, subscription requests 122, subscription policies 124, customer edge devices 130, nodes 140, EVPN advertisement routes 170, sequence numbers 172, EVPN advertisement routes 180, and updated sequence numbers 182, this disclosure contemplates any suitable number of networks 110, route reflectors 120, subscription requests 122, subscription policies 124, customer edge devices 130, nodes 140, EVPN advertisement routes 170, sequence numbers 172, EVPN advertisement routes 180, and updated sequence numbers 182. For example, system 100 may include more than one route reflector 120 and/or more or less than three nodes 140.

Figure 2:
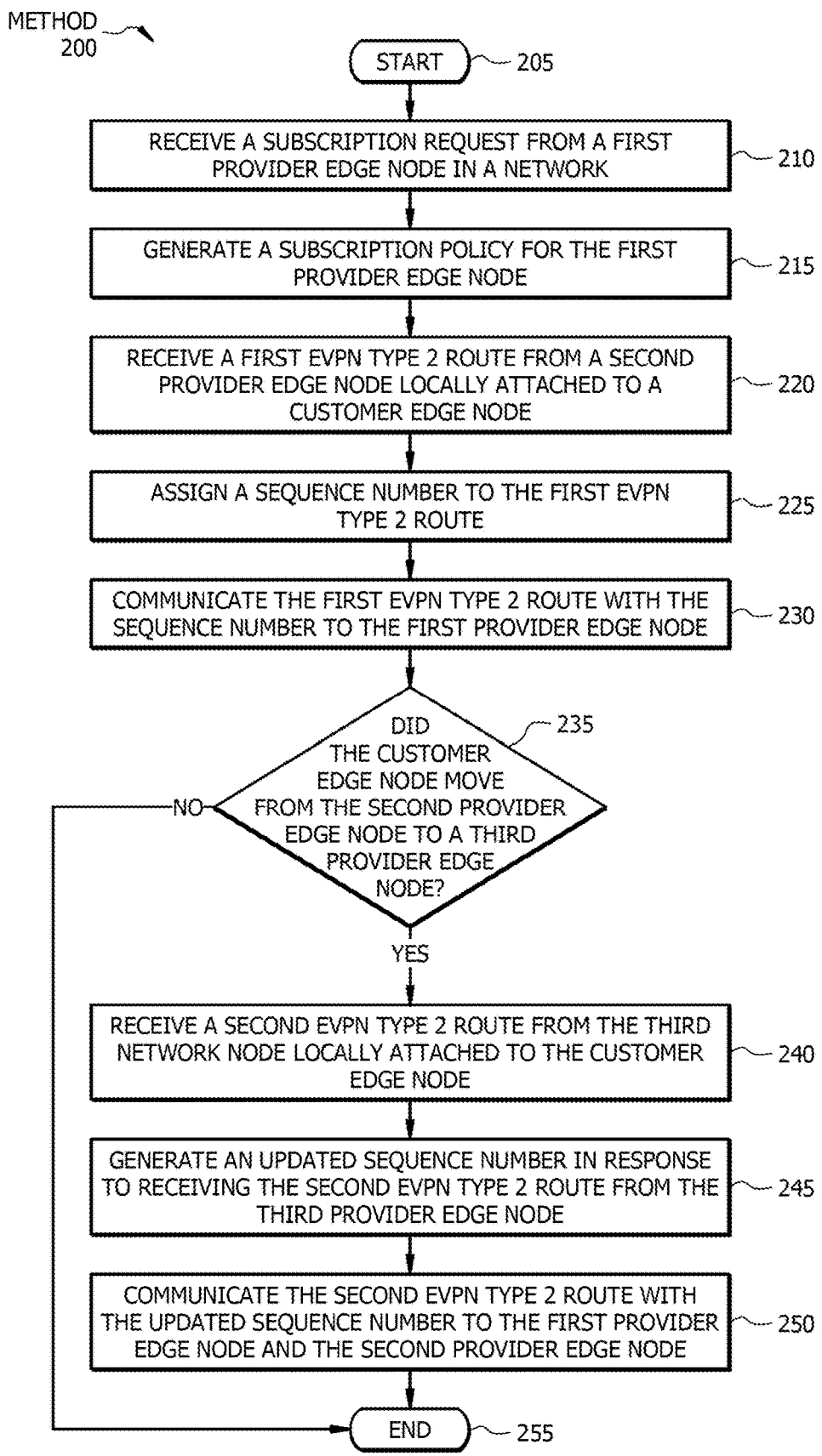
FIG. 2 illustrates an example method for subscription based selective EVPN route distribution.

FIG. 2 illustrates an example method 200 for subscription based selective EVPN route distribution. Method 200 begins at step 205. At step 210, a network component (e.g., route reflector 120 of FIG. 1) receives a subscription request (e.g., subscription request 122 of FIG. 1) from a first provider edge node (e.g., node 140*c* of FIG. 1) in a network (e.g., network 110 of FIG. 1). In certain embodiments, the network is an EVPN IRB network. The first provider edge node may be a border provider edge node. In some embodiments, the subscription request includes an ORF, which may include an AFI/SAFI component that is set to EVPN. In some embodiments, the ORF defines a Route Type 2 ORF type as a sub-TLV. The sub-TLV indicates one of the following Route Type 2 subscription types: MAC only; IPv4 only; IPv6 only; MAC+IPv4; or MAC+IPv6.

Method 200 then moves from step 210 to step 215, where the network component generates a subscription policy (e.g., subscription policy 124 of FIG. 1) for the first provider edge node. The subscription policy may be generated in accordance with one of the following subscription implementation options: an exact match subscription DB per UG; a subscription bitmask per Route Type 2; or a TXLIST per UG. Method 200 then moves from step 215 to step 220.

At step 220 of method 200, the network component receives a first EVPN Type 2 Route (e.g., EVPN advertisement route 170 of FIG. 1) from a second provider edge node (e.g., node 140*a* of FIG. 1) in the network. The first EVPN Type 2 Route includes a MAC and/or IP address of a customer edge node (e.g., customer edge device 130 of FIG. 1). In certain embodiments, the customer edge node is a host. The customer edge node is locally attached to the second provider edge node when the network component receives the first EVPN Type 2 Route from the second provider node.

Method 200 then moves from step 220 to step 225, where the network component assigns a sequence number (e.g., sequence number 172 of FIG. 1) to the first EVPN Type 2 Route. If this is the first mobility event for the local MAC and/or IP address of the customer edge device, the first EVPN Type 2 Route communicated from the second provider edge node to the route reflector will not carry a sequence number via a MAC mobility extended community attribute. As such, the value of the sequence number for the first mobility event for the local MAC and/or IP address of the customer edge device is assumed to be 0. Method 200 then moves from step 225 to step 230.

At step 230 of method 200, the network component communicates the first EVPN Type 2 Route with the sequence number to the first provider edge node since the first provider edge subscribed to the EVPN Type 2 Route. Method 200 then moves from step 230 to step 235, where method 200 determines whether the customer edge node moved from the second provider edge node to a third provider edge node (e.g., node 140*b* of FIG. 1). If the customer edge node is still attached to the second provider edge node, method 200 advances from step 235 to step 255, where method 200 ends.

If, at step 235, the customer edge node moved from the second provider edge node and attached itself to the third provider edge node, method 200 moves from step 235 to step 240, where the network component receives a second EVPN Type 2 Route (e.g., EVPN Type 2 Route 180) from the third provider edge node. The second EVPN Type 2 Route includes the MAC and/or IP address of the customer edge node. The customer edge node is locally attached to the third provider edge node when the network component receives the second EVPN Type 2 Route from the third provider node. Upon receiving the second EVPN Type 2 Route from the third provider edge node, the network component compares the second EVPN Type 2 Route against any pre-existing best path (e.g., the first EVPN Type 2 Route) with a different ESI. Method 200 then moves from step 240 to step 245.

At step 245 of method 200, the network component generates an updated sequence number (e.g., sequence number 182 of FIG. 1) in response to receiving the second EVPN Type 2 Route from the third provider edge node. For example, based on the comparison of the second EVPN Type 2 Route against the first EVPN Type 2 Route, the network component may update the sequence number by a value of one (e.g., from a value of 0 to a value of 1). Method 200 then moves from step 245 to step 250, where the network component communicates the second EVPN Type 2 Route with the updated sequence number to the first provider edge node since the first provider edge node subscribed to the EVPN Type 2 Route. The network component also communicates the second EVPN Type 2 Route with the updated sequence number to the second provider edge node since the second provider edge node is the originating node for the previous best path. The originating node is implicitly subscribed to the EVPN Type 2 Route 180, which allows the originating node to trigger cleanup/duplicate detection procedures for its local path. Method 200 then moves from step 250 to step 255, where method 200 ends.

Although this disclosure describes and illustrates particular steps of the method of FIG. 2 as occurring in a particular order, this disclosure contemplates any suitable steps of the method of FIG. 2 occurring in any suitable order. For example, method 200 may include a step where the customer edge node moves from the third provider edge node to a fourth provider edge node. Moreover, although this disclosure describes and illustrates an example method for subscription based selective EVPN route distribution including the particular steps of the method of FIG. 2, this disclosure contemplates any suitable method for subscription based selective route distribution including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
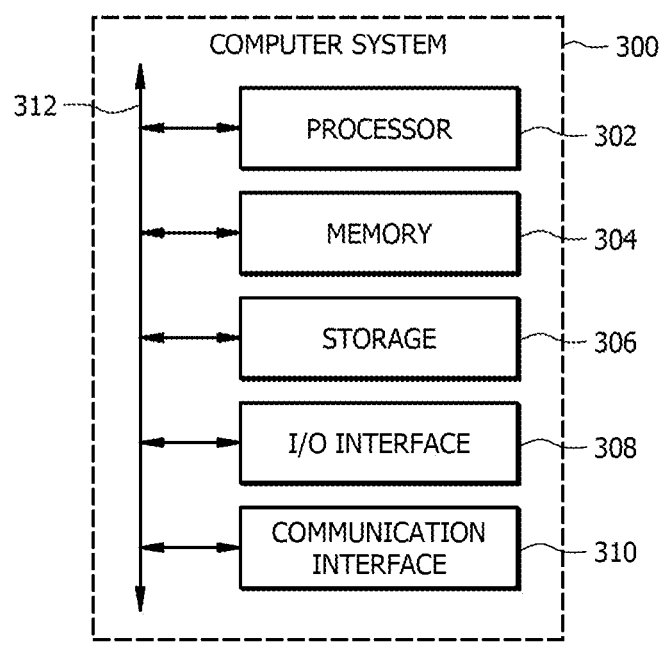
FIG. 3 illustrates an example computer system that may be used by the systems and methods described herein.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   receiving a subscription request from a first Border Gateway Protocol (BGP) node in a network, the subscription request comprising a first BGP route advertisement, wherein the first BGP route advertisement contains a route filter for an Address Family Identifier (AFI)/Subsequent Address Family Identifier (SAFI);
   generating a subscription policy in accordance with the route filter contained in the subscription request;
   receiving a second BGP route advertisement from a second BGP node in the network; and
   communicating routing information in the second BGP route advertisement to the first BGP node based on the subscription policy.

2. The method of claim 1, wherein the subscription request is an Ethernet Virtual Private Network (EVPN) subscription request.

3. The method of claim 2, wherein the subscription request is an EVPN Type 2 subscription request.

4. The method of claim 1, wherein the subscription request results in a modification of an Outbound Route Filter (ORF).

5. The method of claim 1, wherein the subscription request is based on an active flow associated with the first BGP node.

6. The method of claim 1, wherein the subscription request and subsequent routing information traverse at least one intermediate node.

7. The method of claim 1, wherein the first BGP node is a provider edge node.

8. The method of claim 1, wherein the subscription request is received by a route reflector.

9. An apparatus, comprising:
   one or more processors; and
   one or more computer-readable non-transitory storage media coupled to the one or more processors and comprising instructions that, when executed by the one or more processors, cause the apparatus to perform operations comprising:
      receiving a subscription request from a first Border Gateway Protocol (BGP) node in a network, the subscription request comprising a first BGP route advertisement, wherein the first BGP route advertisement contains a route filter for an Address Family Identifier (AFI)/Subsequent Address Family Identifier (SAFI);
      generating a subscription policy in accordance with the route filter contained in the subscription request;
      receiving a second BGP route advertisement from a second BGP node in the network; and
      communicating routing information in the second BGP route advertisement to the first BGP node based on the subscription policy.

10. The apparatus of claim 9, wherein the subscription request is an Ethernet Virtual Private Network (EVPN) subscription request.

11. The apparatus of claim 10, wherein the subscription request is an EVPN Type 2 subscription request.

12. The apparatus of claim 9, wherein the subscription request results in a modification of an Outbound Route Filter (ORF).

13. The apparatus of claim 9, wherein the subscription request is based on an active flow associated with the first BGP node.

14. The apparatus of claim 9, wherein the subscription request and subsequent routing information traverse at least one intermediate BGP node.

15. The apparatus of claim 9, wherein the first BGP node is a provider edge node.

16. The apparatus of claim 9, wherein the subscription request is received by a route reflector.

17. One or more computer-readable non-transitory storage media embodying instructions that, when executed by a processor, cause the processor to perform operations comprising:
   receiving a subscription request from a first Border Gateway Protocol (BGP) node in a network, the subscription request comprising a first BGP route advertisement, wherein the first BGP route advertisement contains a route filter for an Address Family Identifier (AFI)/Subsequent Address Family Identifier (SAFI);
   generating a subscription policy in accordance with the route filter contained in the subscription request;
   receiving a second BGP route advertisement from a second BGP node in the network; and
   communicating routing information in the second BGP route advertisement to the first BGP node based on the subscription policy.

18. The one or more computer-readable non-transitory storage media of claim 17, wherein the subscription request is an Ethernet Virtual Private Network (EVPN) subscription request.

19. The one or more computer-readable non-transitory storage media of claim 18, wherein the subscription request is an EVPN Type 2 subscription request.

20. The one or more computer-readable non-transitory storage media of claim 17, wherein the subscription request results in a modification of an Outbound Route Filter (ORF).

21. The one or more computer-readable non-transitory storage media of claim 17, wherein the subscription request is based on an active flow associated with the first BGP node.

22. The one or more computer-readable non-transitory storage media of claim 17, wherein the subscription request and subsequent routing information traverse at least one intermediate BGP node.

23. The one or more computer-readable non-transitory storage media of claim 17, wherein the first BGP node is a provider edge node.

24. The one or more computer-readable non-transitory storage media of claim 17, wherein the subscription request is received by a route reflector.

* * * * *